United States Patent
Nakajima

(10) Patent No.: US 9,665,319 B2
(45) Date of Patent: May 30, 2017

(54) IMAGE FORMING APPARATUS, SYSTEM, CONTROL METHOD, AND STORAGE MEDIUM FOR PRINTING RECEIVED PRINT DATA

(71) Applicant: CANON KABUSHIKI KAISHA, Tokyo (JP)

(72) Inventor: Satoru Nakajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/313,789

(22) Filed: Jun. 24, 2014

(65) Prior Publication Data

US 2015/0002882 A1 Jan. 1, 2015

(30) Foreign Application Priority Data

Jun. 28, 2013 (JP) .................................. 2013-136173

(51) Int. Cl.
*G06F 3/12* (2006.01)
*G06K 15/02* (2006.01)
*G06K 15/00* (2006.01)

(52) U.S. Cl.
CPC .......... *G06F 3/1218* (2013.01); *G06F 3/1267* (2013.01); *G06F 3/1286* (2013.01); *G06K 15/1822* (2013.01); *G06K 15/4095* (2013.01); *G06F 3/1222* (2013.01); *G06F 3/1238* (2013.01)

(58) Field of Classification Search
CPC .... G06F 3/1218; G06F 3/1286; G06F 3/1267; G06F 3/1222; G06F 3/1238; G06K 15/1822; G06K 15/4095

USPC ...................................... 358/1.13, 1.14, 1.15
See application file for complete search history.

(56) References Cited

U.S. PATENT DOCUMENTS

| 2010/0118329 | A1 | 5/2010 | Fujiki et al. |
| 2012/0113470 | A1* | 5/2012 | Atsumi ................. G06F 3/1204 358/1.15 |
| 2012/0148323 | A1* | 6/2012 | Shimada et al. ................. 400/76 |
| 2013/0077112 | A1* | 3/2013 | Dodd ................... G06K 15/005 358/1.13 |
| 2013/0155454 | A1* | 6/2013 | Saitoh ................... G06F 3/1296 358/1.15 |

FOREIGN PATENT DOCUMENTS

| CN | 101462421 A | 6/2009 |
| CN | 102609226 A | 7/2012 |
| JP | 2008-225682 A | 9/2008 |
| JP | 2011-223180 A | 11/2011 |

* cited by examiner

*Primary Examiner* — Kent Yip
(74) *Attorney, Agent, or Firm* — Canon U.S.A., Inc. IP Division

(57) ABSTRACT

An image forming apparatus includes a receiving unit configured to receive print data, a storage unit configured to store the print data, an authentication unit configured to authenticate a user, and a control unit configured, when a plurality of print data, which is associated with the authenticated user, to which same identification information is added is stored in the storage unit, to display the identification information and control print data selected according to an instruction from the user to be printed, and configured, when a plurality of print data to which same identification information is added is not stored in the storage unit, to perform control so that the print data stored in the storage unit is printed without a selection operation by the user.

11 Claims, 12 Drawing Sheets

FIG. 8

| USER | DATE AND TIME | STORAGE LOCATION | DOCUMENT NAME | PRINT SETTING |
|---|---|---|---|---|
| UserA | 2012/04/10 10:34:45 | /data/0015/xxx | AAA.txt | ONE-SIDED, 1 COPY, MONOCHROME |
| UserB | 2012/04/20 13:50:22 | /data/0591/yyy | BBB.pdf | TWO-SIDED, 3 COPIES, COLOR |
| UserC | 2012/05/28 14:10:00 | /data/8125/zzz | CCC.doc | TWO-SIDED, 5 COPIES, COLOR |

801 802 804 805 806

IMAGE FORMING APPARATUS, SYSTEM, CONTROL METHOD, AND STORAGE MEDIUM FOR PRINTING RECEIVED PRINT DATA

BACKGROUND OF THE INVENTION

Field of the Invention

The present invention relates to an image forming apparatus capable of storing and printing received print data.

Description of the Related Art

An image forming apparatus in these days temporarily stores print data input from a printer driver into a hard disk mounted inside thereof. When a user logs into the image forming apparatus, the image forming apparatus prints the print data belonging to the login user. In the image forming apparatus, thus, the print data is temporarily stored and then printed for security reasons.

Such an image forming apparatus first authenticates a user who is to use the apparatus. Upon completion of the user authentication, the image forming apparatus displays a list of document names of the print data belonging to the authenticated user and a print setting on an operation unit. The user selects the name of a desired document from the displayed list to instruct the image forming apparatus to print the print data corresponding to the desired document. Accordingly, the image forming apparatus prints the print data of the desired document.

Meanwhile, Japanese Patent Application Laid-Open No. 2011-223180 discuses an image forming apparatus which automatically begins to perform print processing without an operation for selecting a document name by a user. Such an image forming apparatus enables the user to save labor in selecting a desired document from a displayed list.

According to the method discussed in Japanese Patent Application Laid-Open No. 2011-223180, the image forming apparatus automatically begins to perform the print processing on print data of the authenticated user. However, there may be cases where the user accidentally transmits the same print data to the image forming apparatus twice, or the user retransmits print data after changing a print setting. In such cases, the image forming apparatus automatically prints each of all the print data. Consequently, there is a possibility that the image forming apparatus may perform unnecessary printing.

SUMMARY OF THE INVENTION

The present invention is directed to image forming apparatus capable of providing a configuration for reducing unnecessary printing.

According to an aspect of the present invention, an image forming apparatus includes a receiving unit configured to receive print data, a storage unit configured to store the print data, an authentication unit configured to authenticate a user, and a control unit configured, when a plurality of print data, which is associated with the authenticated user, to which same identification information is added is stored in the storage unit, to display the identification information and perform control so that print data selected according to an instruction from the user is printed, and configured, when a plurality of print data to which same identification information is added is not stored in the storage unit, to perform control so that the print data stored in the storage unit is printed without a selection operation by the user.

Moreover, according to an aspect of the present invention, An image forming apparatus includes a receiving unit configured to receive print data, a storage unit configured to store the print data received by the receiving unit, an authentication unit configured to authenticate a user, and a control unit configured, when a plurality of print data, which is associated with the user authenticated by the authentication unit, to which same identification information is added is stored in the storage unit, to perform control so that print data received later by the receiving unit is printed among the plurality of print data to which the same identification information is added, and configured, when a plurality of print data to which same identification information is added is not stored in the storage unit, to perform control so that the print data stored in the storage unit is printed without a selection operation by the user.

According to the aspects of the present invention, unnecessary printing can be prevented.

Further features of the present invention will become apparent from the following description of exemplary embodiments with reference to the attached drawings.

BRIEF DESCRIPTION OF THE DRAWINGS

FIG. 8 is a diagram illustrating one example of bibliographic information of print data.

DESCRIPTION OF THE EMBODIMENTS

Various exemplary embodiments, features, and aspects of the invention will be described in detail below with reference to the drawings.

Figure 1:
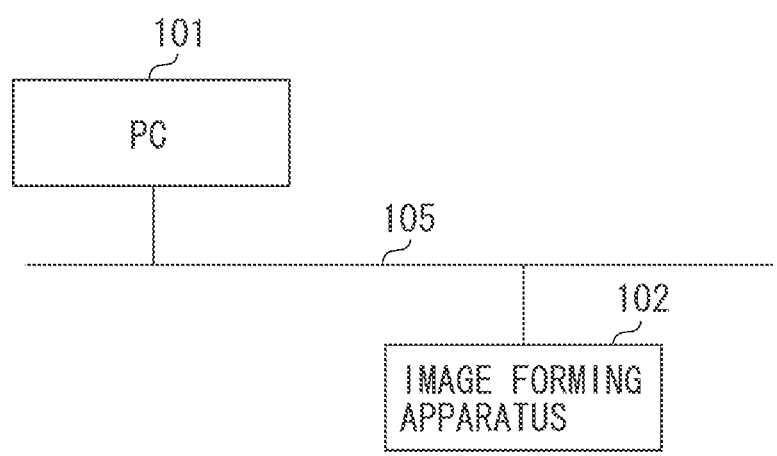
FIG. 1 is a diagram illustrating one example of a network configuration.

FIG. 1 is a diagram illustrating a network configuration according to a first exemplary embodiment. A personal computer (PC) 101 and an image forming apparatus 102 are communicably connected on a local area network (LAN) 105.

In the PC 101, a printer driver is installed to generate print data from a document generated by an application such as a document generation application and a spreadsheet application. The printer driver generates the print data from document data generated by the application according to an instruction from a user (hereinafter referred to as a document operator) who instructs the image forming apparatus 102 to print the document. The printer driver transmits the print data to the image forming apparatus 102 designated by the document operator.

The image forming apparatus 102 includes a hard disk for storing print data transmitted from the PC 101. When the user logs into the image forming apparatus 102 and issues a print instruction, the image forming apparatus 102 acquires print data from the hard disk. Upon acquisition of the print data, the image forming apparatus 102 forms an image and prints the image on printing paper.

In the present exemplary embodiment, the PC 101 is described as an example of an external device. However, a device other than the PC 101 may be used. For example, a mobile terminal and another image forming apparatus may be used.

Figure 2:
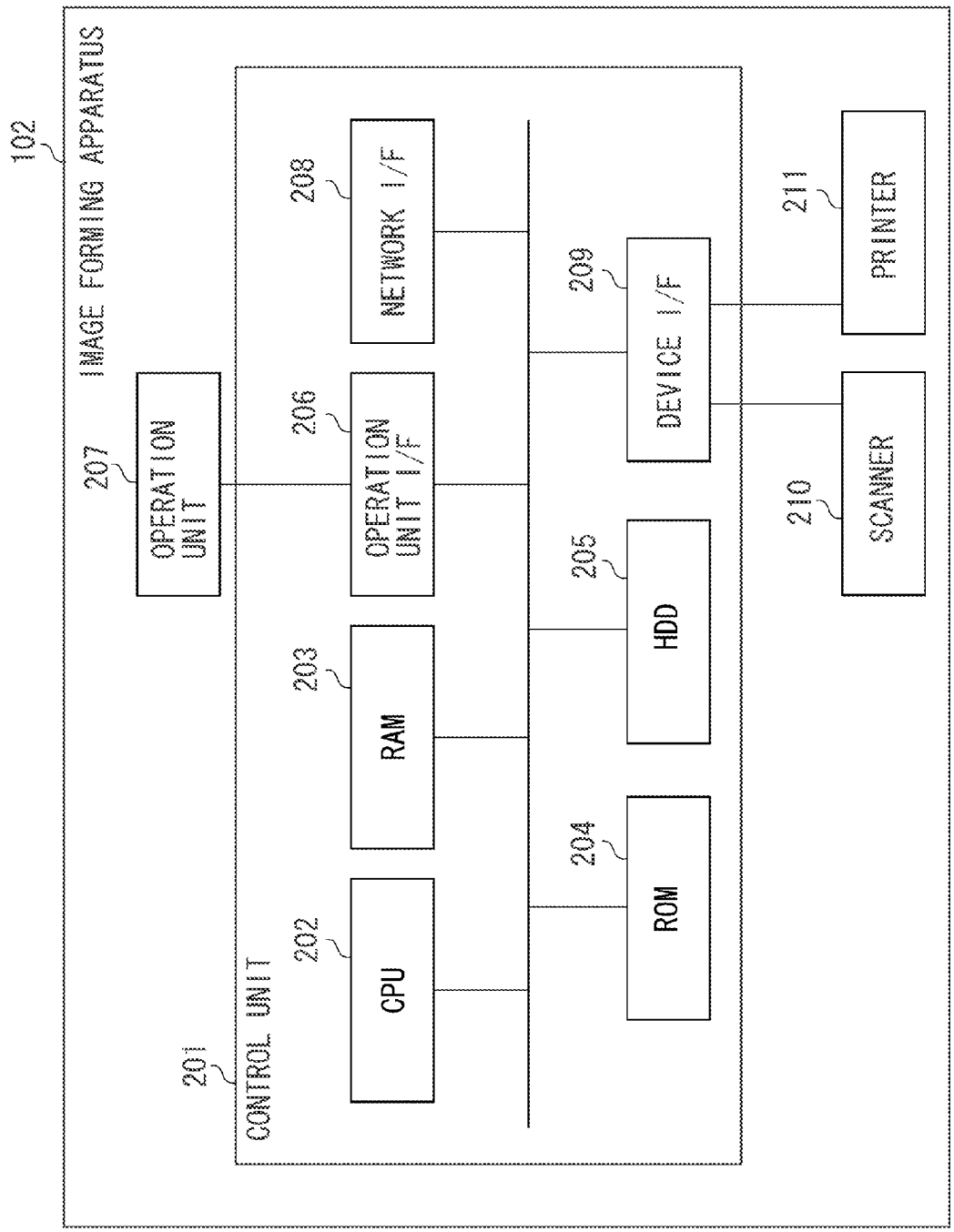
FIG. 2 is a block diagram illustrating a hardware configuration of an image forming apparatus.

FIG. 2 is a block diagram illustrating a hardware configuration of the image forming apparatus 102. The image forming apparatus 102 includes a control unit 201, an operation unit 207, a scanner 210, and a printer 211.

In the control unit 201, the following devices are connected to a system bus. That is, a central processing unit (CPU) 202, a random access memory (RAM) 203, a read only memory (ROM) 204, a hard disk drive (HDD) 205, an operation unit interface (I/F) 206, a network I/F 208, and a device I/F 209 are connected to the system bus. The CPU 202 serves as an arithmetic device for controlling each of the devices in the control unit 201. The CPU 202 executes a program stored in the ROM 204 and/or the HDD 205 to perform each step of the flowcharts described below. The RAM 203 serves as a system work memory for operations of the CPU 202. The RAM 203 also serves as an image memory for temporarily storing image data. The RAM 203 stores an operating system, system software, a program such as the above-described application software, and data. The ROM 204 serves as a memory for storing a boot program of a system. The HDD 205 serves as a storage device for storing an operating system, system software, application software, image data, and setting data.

The operation unit I/F 206 is an interface to the operation unit 207. The operation unit I/F 206 outputs information to be displayed on a liquid crystal touch panel of the operation unit 207, to the operation unit 207. Moreover, the operation unit I/F 206 receives information input by a user thorough a keyboard arranged on the operation unit 207. The network I/F 208 is connected to the LAN 105, so that information is input from and output to an external device such as the PC 101 connected to the LAN 105. The device I/F 209 connects the scanner 210 serving as an image input device and the printer 211 serving as an image output device to the control unit 201, so that print data is input and output. These devices are arranged on the system bus.

Figure 3:
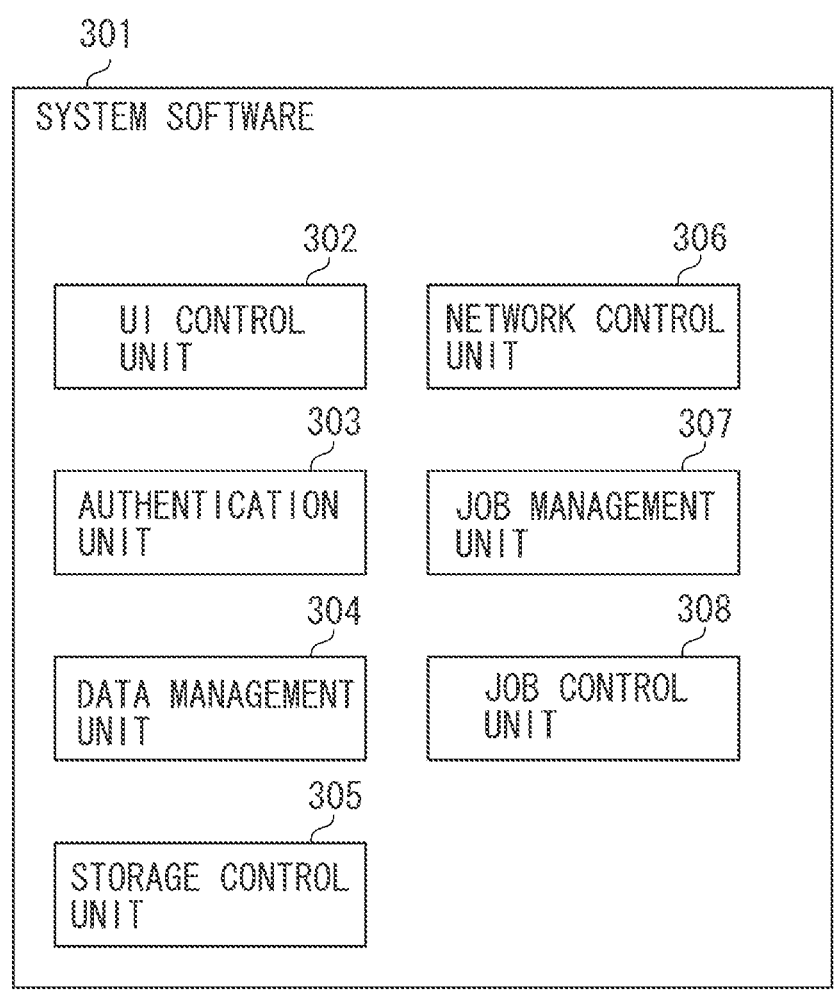
FIG. 3 is a block diagram illustrating a functional configuration of system software of the image forming apparatus.

FIG. 3 is a block diagram illustrating a functional configuration of system software 301 of the image forming apparatus 102. The system software 301 may be stored in any of the storage devices of the RAM 203, the ROM 204, and the HDD 205. The system software 301 is executed by the CPU 202.

A user interface (UI) control unit 302 receives information input by the user from the keyboard of the operation unit 207 via the operation unit I/F 206. Upon reception of the information, the UI control unit 302 analyzes the information, and transmits the resultant information to an authentication unit 303, a data management unit 304, or a job management unit 307. Moreover, the UI control unit 302 can receive a response from the authentication unit 303, the data management unit 304, or the job management unit 307. Upon reception of the response, the UI control unit 302 analyzes the response, and outputs the resultant information of the response to the liquid crystal touch panel on the operation unit 207 via the operation unit I/F 206.

The authentication unit 303 checks whether the user is authenticated based on authentication information received from the UI control unit 302. More specifically, the authentication unit 303 checks a user ID and a password stored in the HDD 205 with a user ID and a password input from the operation unit 207. If the user ID and the password stored in the HDD 205 match the user ID and the password input from the operation unit 207, the authentication unit 303 notifies the UI control unit 302 of authentication success. On the other hand, if the user ID and the password stored in the HDD 205 do not match those input from the operation unit 207, the authentication unit 303 notifies the UI control unit 302 of authentication failure.

The data management unit 304 receives a data writing/reading request from any of the UI control unit 302, a network control unit 306, and the job management unit 307. Subsequently, the data management unit 304 transmits the data writing/reading request to a storage control unit 305. Moreover, the data management unit 304 can receive a response from the storage control unit 305, and transmit information of the response to the UI control unit 302, the network control unit 306, or the job management unit 307.

The storage control unit 305 receives the data writing/reading request from the data management unit 304. The storage control unit 305 writes data into and reads data from the HDD 205. Then, the storage control unit 305 transmits a result of the data writing/reading to the data management unit 304.

The network control unit 306 receives a request from an external device such as the PC 101 connected to the LAN 105, via the network I/F 208. The network control unit 306 requests, depending on the received request, the data management unit 304 or the job management unit 307 to execute processing. Moreover, the network control unit 306 can receive a response from the data management unit 304 or the job management unit 307. The network control unit 306 transmits the received response to the PC 101 and an optional image forming apparatus connected to the LAN 105, through the network I/F 208.

The job management unit 307 receives a job execution request from any of the UI control unit 302 and the network control unit 306, and manages a job.

Then, the job management unit 307 requests a job control unit 308 to execute a job, or transmits a data writing/reading request to the data management unit 304. Moreover, the job management unit 307 can receive a response from the data management unit 304 or the job control unit 308, and transmit a job state to the UI control unit 302 or the network control unit 306.

The job control unit 308 receives the job execution request from the job management unit 307. The job control unit 308 controls, in response to the received job execution request, an operation of the scanner 210 or the printer 211 via the device I/F 209. Moreover, the job control unit 308 can receive an operation state of the scanner 210 or the printer 211 via the device I/F 209, and transmit the received operation state to the job management unit 307.

Figure 4:
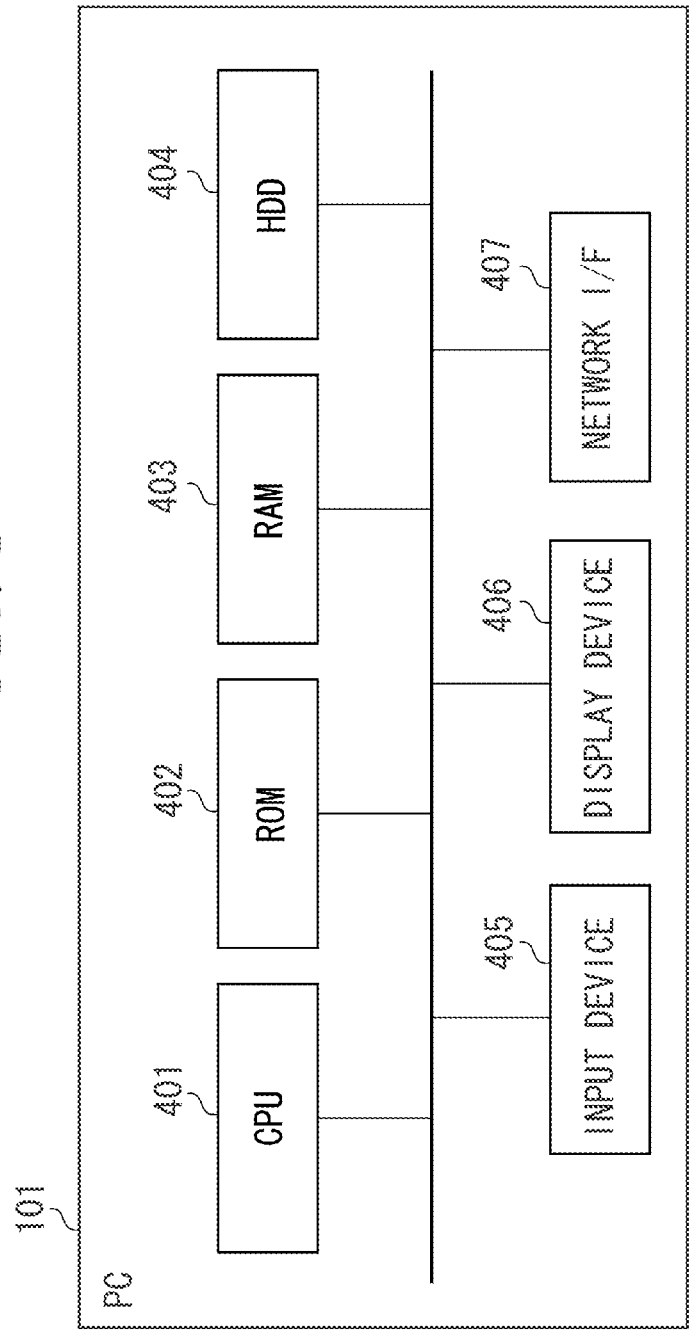
FIG. 4 is a block diagram illustrating a hardware configuration of a personal computer (PC).

FIG. 4 is a block diagram illustrating a hardware configuration of the entire PC 101. In the PC 101, a CPU 401 serves as an arithmetic device for controlling the entire system. A ROM 402 stores programs and data relating to each processing. A RAM 403 serves as a system work memory for operations of the CPU 401. The RAM 403 also serves as a storage memory for temporarily storing data relating to each processing. A HDD 404 stores programs and data relating to each processing, temporary data, and applications. An input device 405 is, for example, a keyboard and a pointing device for receiving an instruction to the PC 101. A display device 406 displays an operation state of the PC 101 and information output by each of the programs operated on the PC 101. A network I/F 407 is connected to the LAN 105, so that information is input from and output to other devices such as another PC and the image forming apparatus 102 connected to the same LAN 105. Each of these elements is arranged on the system bus.

The CPU 401 executes processing based on an operating system (OS), a printer driver, and an application stored in the HDD 404, each corresponding to a program, so that functions (or processing) of the OS and the printer driver are implemented.

Figure 5:
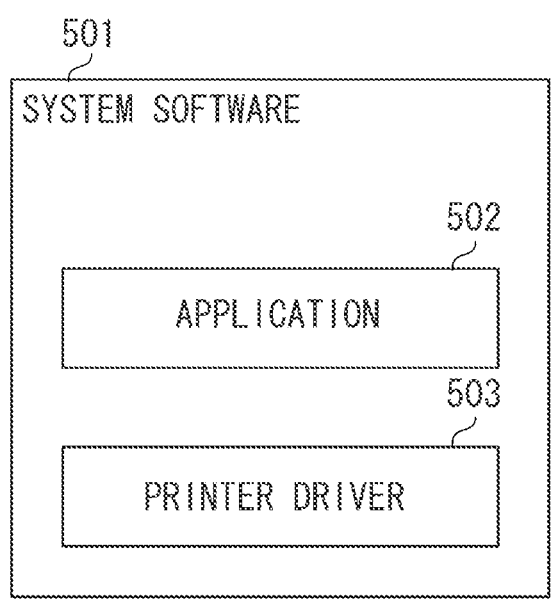
FIG. 5 is a block diagram illustrating a configuration of system software of the PC.

FIG. 5 is a block diagram illustrating a configuration of system software 501 of the PC 101. The system software 501 is stored in any of the ROM 402, the RAM 403, and the HDD 404. The system software 501 is executed by the CPU 401.

The system software 501 includes an application 502 and a printer driver 503. For example, the application 502 serving as a tool is used when a user generates and edits an image and a document using the input device 405 such as a pointing device and a keyboard while looking at the display device 406 of the PC 101. After generating data such as an image and a document using the application 502, the user generates a print command data using the printer driver 503. Then, the user transmits the generated command data to the image forming apparatus 102.

Figure 6:
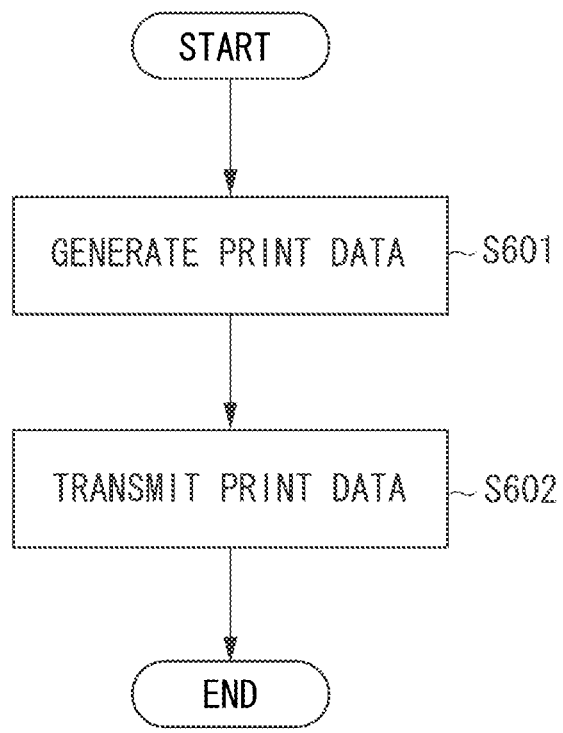
FIG. 6 is a flowchart illustrating print data transmission processing.

FIG. 6 is a flowchart illustrating print data transmission processing executed by the CPU 401 of the PC 101. In the present exemplary embodiment, the PC 101 inputs a print job to the image forming apparatus 102.

In step S601, when the user issues an instruction that the document data generated by using the application 502 is to be printed, the printer driver 503 generates page description language (PDL) data from the document data. The user uses the input device 405 such as a pointing device and a key board to issue the print instruction. The printer driver 503 generates the PDL data according to a print setting which has been set in the printer driver when the print instruction is issued. In step S602, the printer driver 503 transmits the PDL data as print data to an image forming apparatus designated by the user. Hereinafter, the present exemplary embodiment is described with the image forming apparatus 102 illustrated in FIG. 1 as the image forming apparatus having been designated by the user, and thus the print data is transmitted to the image forming apparatus 102.

Figure 7:
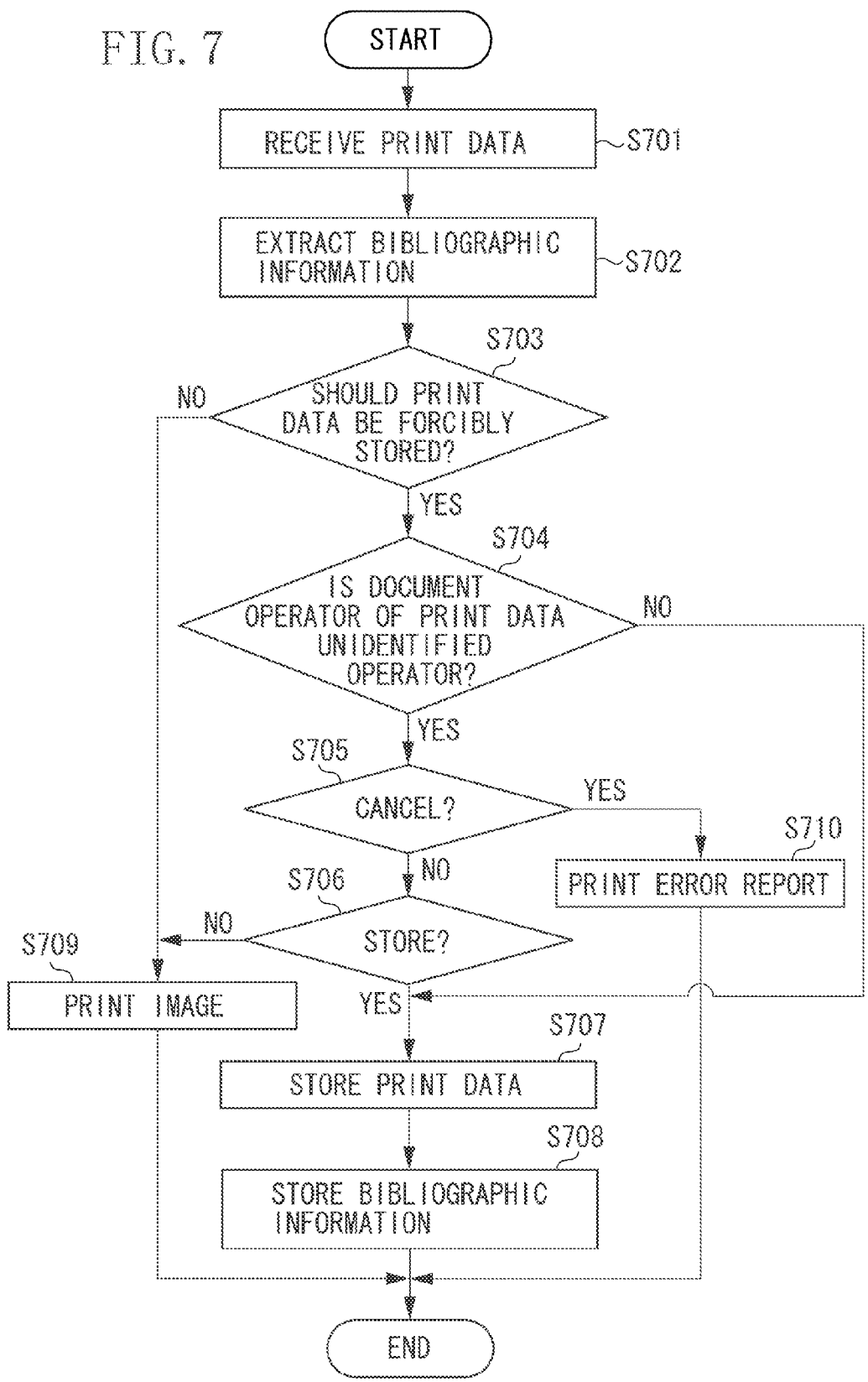
FIG. 7 is a flowchart illustrating print data storing processing.

FIG. 7 is a flowchart illustrating processing performed when the image forming apparatus 102 receives the print data. The CPU 202 executes the program loaded from the HDD 205 to the RAM 203 to perform each step of the flowchart illustrated in FIG. 7. Upon receiving the print data transmitted from the PC 101, the processing of the flowchart illustrated in FIG. 7 begins.

In step S701, the CPU 202 receives the print data from the PC 101 via the network I/F 208. In step S702, the CPU 202 extracts information added to the received print data, including a document name, a document operator, and a print setting. The information extracted in step S702 is hereinafter referred to as "bibliographic information". The bibliographic information is not limited to the above information. For example, the bibliographic information may include identification information of an application that has transmitted the print data, and a language type of PDL. Further, the bibliographic information may include identification information added by the printer driver of the PC 101.

In step S703, the CPU 202 determines, based on a setting stored in the RAM 203, whether the print data should be forcibly stored. Herein, the CPU 202 makes a determination according to a setting value 1002 set on a screen illustrated in FIG. 10. This setting value 1002 is set beforehand by an administrator and stored in the HDD 205. The RAM 203 reads the setting value 1002 when the image forming apparatus 102 is activated. If the setting value 1002 read by the RAM 203 is enabled, the CPU 202 determines that the print data should be forcibly stored.

If the CPU 202 determines that the print data should not be forcibly stored (NO in step S703), the operation proceeds to step S709. In step S709, the CPU 202 controls the printer 211 to print an image on a sheet by forming the image based on the received print data. On the other hand, if the CPU 202 determines that the print data should be forcibly stored (YES in step S703), the operation proceeds to step S704. In step S704, the CPU 202 determines whether a document operator of the received print data is an unidentified operator. The document operator can be identified by analyzing the bibliographic information added to the print data and extracted in step S702. More specifically, if the bibliographic information extracted in step S702 does not include user identification information for identifying a user, the document operator cannot be identified. Accordingly, if the CPU 202 determines that the document operator is an unidentified operator (YES in step S704), the operation proceeds to step S705. The determination in step S704 may be made based on a method other than the presence or absence of the user identification information. For example, there may be a case where user identification information is included in the extracted bibliographic information but not analyzable, or a user does not have authorization to log into the image forming apparatus 102. In such cases, the CPU 202 may determine that the document operator of the print data is an unidentified operator (YES in step S704).

Figure 10:
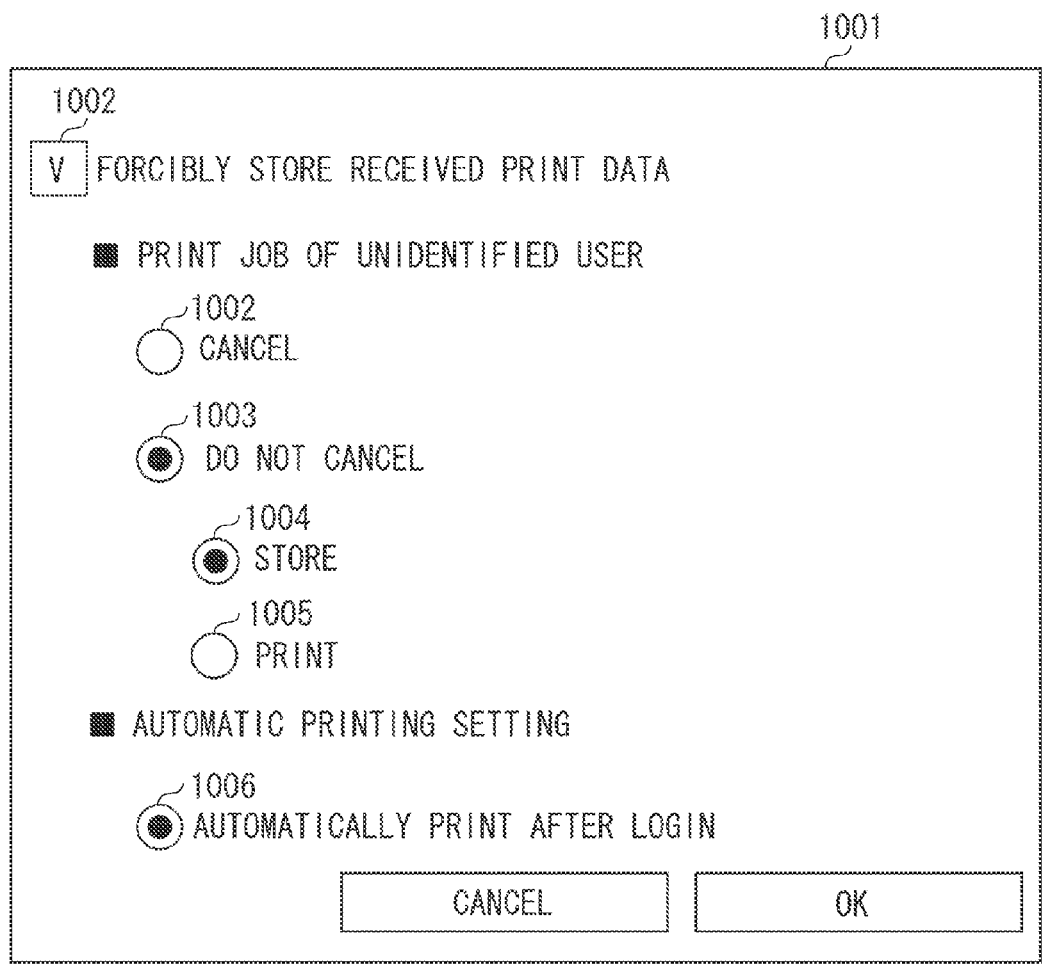
FIG. 10 is a diagram illustrating one example of a setting screen relating to the print processing on the print data.

In step S705, the CPU 202 determines whether to cancel printing of the print data of the unidentified document operator according to the setting value 1002 set on the screen illustrated in FIG. 10. The setting value 1002 is set beforehand by an administrator and stored in the HDD 205. The RAM 203 reads the setting value 1002 when the image forming apparatus 102 is activated. If the setting value 1002 read by the RAM 203 is enabled, the CPU 202 determines that the print data of the unidentified document operator should be cancelled.

If the CPU 202 determines that printing of the print data should be cancelled (YES in step S705), the operation proceeds to step S710. In step S710, the CPU 202 discards the received print data, writes an error log in the HDD 205, and causes the printer 211 to print an error report. In the error report, the printer 211 prints an error code indicating an error type, a date and time on which the print data is received, and bibliographic information such as a document name. Alternatively, the printer 211 may print a message, for example, "since the user is not identified, the print data cannot be printed or stored".

On the other hand, if the CPU 202 determines that printing of the print data of the unidentified document operator should not be cancelled (NO in step S705), the operation proceeds to step S706. In step S706, the CPU 202 determines whether to print or store the print data according to setting values 1003 through 1005 illustrated in FIG. 10. Each of these setting values 1003 through 1005 is set beforehand by an administrator and stored in the HDD 205.

The setting values 1003 through 1005 are written into the RAM 203 when the image forming apparatus 102 is activated. If the setting values written into the RAM 203 indicate that the print data should not be stored, that is, the print data should be printed (NO in step S706), the operation proceeds to step S709. In step S709, the CPU 202 controls the printer 211 to print an image by forming the image based on the received print data. On the other hand, if the CPU 202 determines that the print data should be stored (YES in step S706), the operation proceeds to step S707.

If the CPU 202 determines that the document operator can be identified (NO in step S704), or if the CPU 202 determines that the print data should be stored (YES in step S706), the operation proceeds to step S707. In step S707, the CPU 202 stores the print data received in step S701 in the HDD 205. Subsequently, in step S708, the CPU 202 stores the bibliographic information extracted in step S702 in the HDD 205.

FIG. 8 is a diagram illustrating an example of the information stored in step S708 of the flowchart illustrated in FIG. 7. The information stored in step S708 includes a user 801 as a document operator, a date and time 802 indicating a date and time on which the print data is received, a storage location 804 indicating a location of the stored print data, a document name 805 indicating a name of the print data, and a print setting 806.

Accordingly, the processing performed when the image forming apparatus 102 receives the print data ends.

Next, an operation performed when the print data stored according to the processing illustrated in FIG. 7 is printed is described with reference to FIG. 9.

Figure 9:
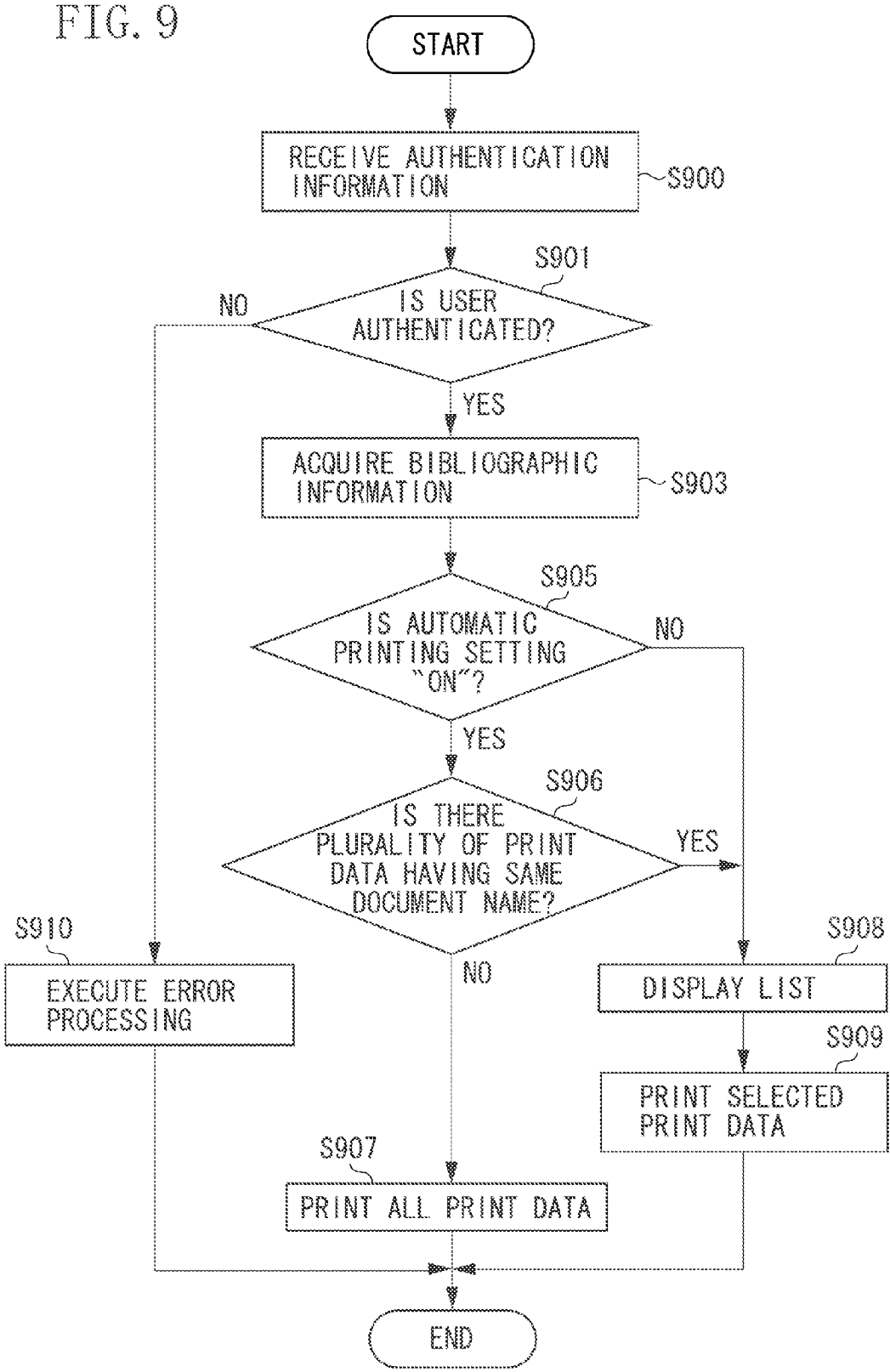
FIG. 9 is a flowchart illustrating print processing on print data.

FIG. 9 is a flowchart illustrating an operation performed by the image forming apparatus 102 when the stored print data is printed according to an instruction from a login user. The CPU 202 executes a program loaded from the HDD 205 to the RAM 203 to perform each step of the flowchart illustrated in FIG. 9.

In step S900, the CPU 202 receives authentication information input by a user through the operation unit 207. In step S901, the CPU 202 checks whether the user is authenticated. If the user authentication fails (NO in step S901), then in step S910, the CPU 202 performs error processing. Then, the processing ends. If the user authentication succeeds (YES in step S901), the CPU 202 permits the user to log into the image forming apparatus 102. Subsequently, in step S903, the CPU 202 acquires bibliographic information corresponding to the login user among bibliographic information stored in the HDD 205.

Subsequently, in step S905, the CPU 202 determines whether the print data should be automatically printed after the user logs into the image forming apparatus 102. Herein, the CPU 202 makes a determination whether the automatic printing setting should be ON according a setting value 1006 set on the screen illustrated in FIG. 10. The setting value 1006 is set beforehand by the administrator and stored in the HDD 205. The setting value 1006 is written into the RAM 203 when the image forming apparatus 102 is activated.

If the automatic printing setting is OFF (NO in step S905), then in step S908, the CPU 202 displays the bibliographic information extracted in step S903 as a list on the operation unit 207. The login user selects at least one desired document to be printed from the list of bibliographic information displayed on the operation unit 207. Subsequently, in step S909, when the login user selects the desired document through the operation unit 207, and the CPU 202 receives a pint instruction, the CPU 202 reads the print data corresponding to the selected bibliographic information from the HDD 205. Then, the CPU 202 causes the printer 211 to print the selected print data.

On the other hand, if the automatic printing setting is ON (YES in step S905), the operation proceeds to step S906. In step S906, the CPU 202 determines whether there is a plurality of print data having the same document name based on the bibliographic information (the bibliographic information of the print data corresponding to the authenticated user) acquired in step S903.

More specifically, among the print data corresponding to the login user, the CPU 202 determines whether a plurality of print data to which the same identification information is added is stored in the HDD 205.

The determination in step S906 may be made as follows. Specifically, the CPU 202 may determine whether there is print data having the same document name among two or more print data stored in the HDD 205, and whether such print data are successively received from the same PC.

Alternatively, the CPU 202 may determine whether there is print data having the same document name among two or more print data stored in the HDD 205, and whether each of such print data has a different print setting.

Alternatively, the CPU 202 may determine whether there is print data having the same document name among two or more print data stored in the HDD 205, and whether such print data is received within a certain time period.

Alternatively, the CPU 202 may analyze a degree of similarity between two or more print data stored in the HDD 205. If the degree of similarity between two or more print data is a permissible value, the CPU 202 may determine that there is a plurality of print data having the same document name (YES in step S906).

If the plurality of print data has the same document name (YES in step S906), then in step S908, the CPU 202 displays the bibliographic information extracted in step S903 as a list on the operation unit 207. Then, in step S909, the CPU 202 receives print data selected as a print target from the list of the bibliographic information displayed on the operation unit 207. The CPU 202 executes print processing on the received print data.

After executing the print processing in step S909, the CPU 202 may automatically delete print data which did not selected by the user among the plurality of print data having the same document name.

On the other hand, if the plurality of print data does not have the same document name (NO in step S906), the operation proceeds to step S907. In step S907, the CPU 202 executes print processing on all the print data corresponding to the bibliographic information acquired in step S903, without a selection made by the login user.

Thus, the description of the processing performed by the image forming apparatus 102 when the print data is printed ends.

In the image forming apparatus 102 according to the present exemplary embodiment, a plurality of print data of an authenticated user may be stored in the HDD 205. In such a case, if the plurality of print data has the same document name, the image forming apparatus 102 displays a list of the document names of the print data to allow the user to select print target data. This reduces the possibility of making a plurality of sets of print copies of the same document, thereby preventing unnecessary printing.

On the other hand, in a case where a plurality of print data satisfying a predetermined condition is not stored, the image forming apparatus 102 begins to perform print processing without selecting print data by the user. Such print processing enables the user to save labor.

The first exemplary embodiment has been described with respect to the example case where a plurality of print data having the same document name is stored, a list of the document names is displayed to allow a user to select the print data to be printed. In a second exemplary embodiment, in a case where a plurality of print data having the same document name is stored, the latest print data is automatically selected while the other print data is deleted. Now, the second exemplary embodiment is described.

Figure 11:
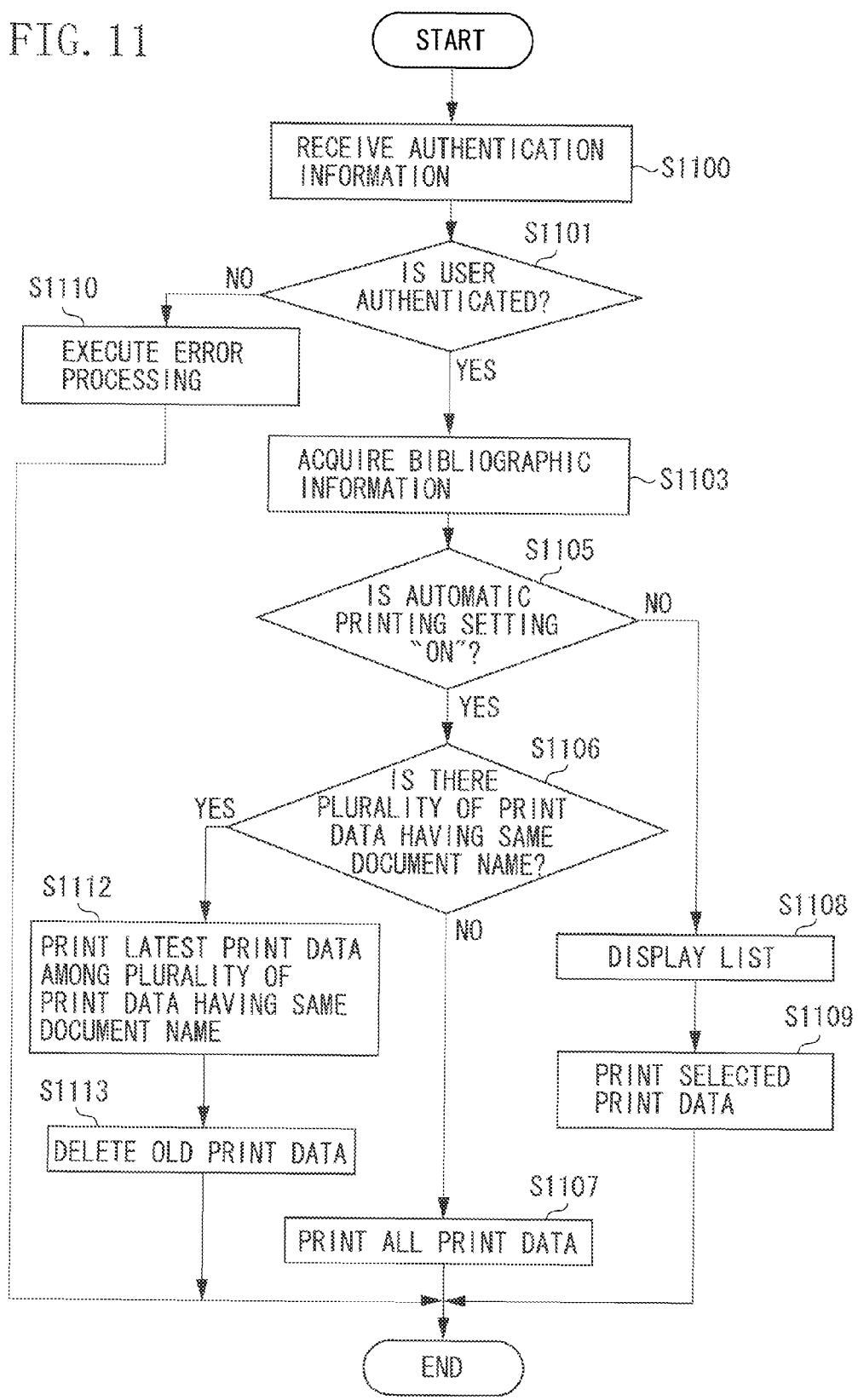
FIG. 11 is a flowchart illustrating print processing according to a second exemplary embodiment.

FIG. 11 is a flowchart illustrating an operation performed by an image forming apparatus 102 when stored print data is printed according to an instruction from a login user according to the second exemplary embodiment. A CPU 202 executes a program loaded from an HDD 205 to a RAM 203 to perform each step of the flowchart illustrated in FIG. 11.

Since processing from step S1100 to step S1110 illustrated in FIG. 11 is substantially the same as that from step S900 to step S910 illustrated in FIG. 9, the description thereof is omitted.

If the CPU 202 determines that a plurality of print data, which is associated with a login user, to which the same document name is added is stored in the HDD 205 (YES in step S1106), the operation proceeds to step S1112. In step S1112, the CPU 202 selects print data having the latest date and time of reception from the plurality of print data having the same document name, and executes print processing on the selected data. Herein, information and a message may be displayed on the operation unit 207. For example, the operation unit 207 may display a document name of the selected print data, a date and time on which the selected print data is received, information such as a print setting, and a message such as "there is a plurality of print data having the same document name. Only the latest print data is printed".

In step S1113, the CPU 202 deletes the other print data not selected in step S1112 and having the same document name from the HDD 205. Alternatively, the CPU 202 may cause the operation unit 207 to display an inquiry whether the other print data should be deleted. In such a case, if the user gives a deletion instruction, the CPU 202 may execute processing of step S1113.

Therefore, even if the automatic printing setting is enabled to automatically perform print processing after user authentication, a print job that is not permitted to undergo the automatic printing may be included. In such a case, the image forming apparatus 102 according to the present exemplary embodiment selects a print job permitted to be printed, and prints the selected print job, thereby preventing unnecessary printing.

The second exemplary embodiment has been described with respect to the example case where a plurality of print data having the same document name is stored, only the latest print data is printed. In a third exemplary embodiment, in a case where a plurality of print data having the same document name is stored, a user is notified accordingly. Thus, the user can change whether a list of the print data should be displayed or the latest print data should be printed.

The third exemplary embodiment is described with respect to an example case in which the latest print data is automatically selected, while the other print data is deleted.

Figure 12:
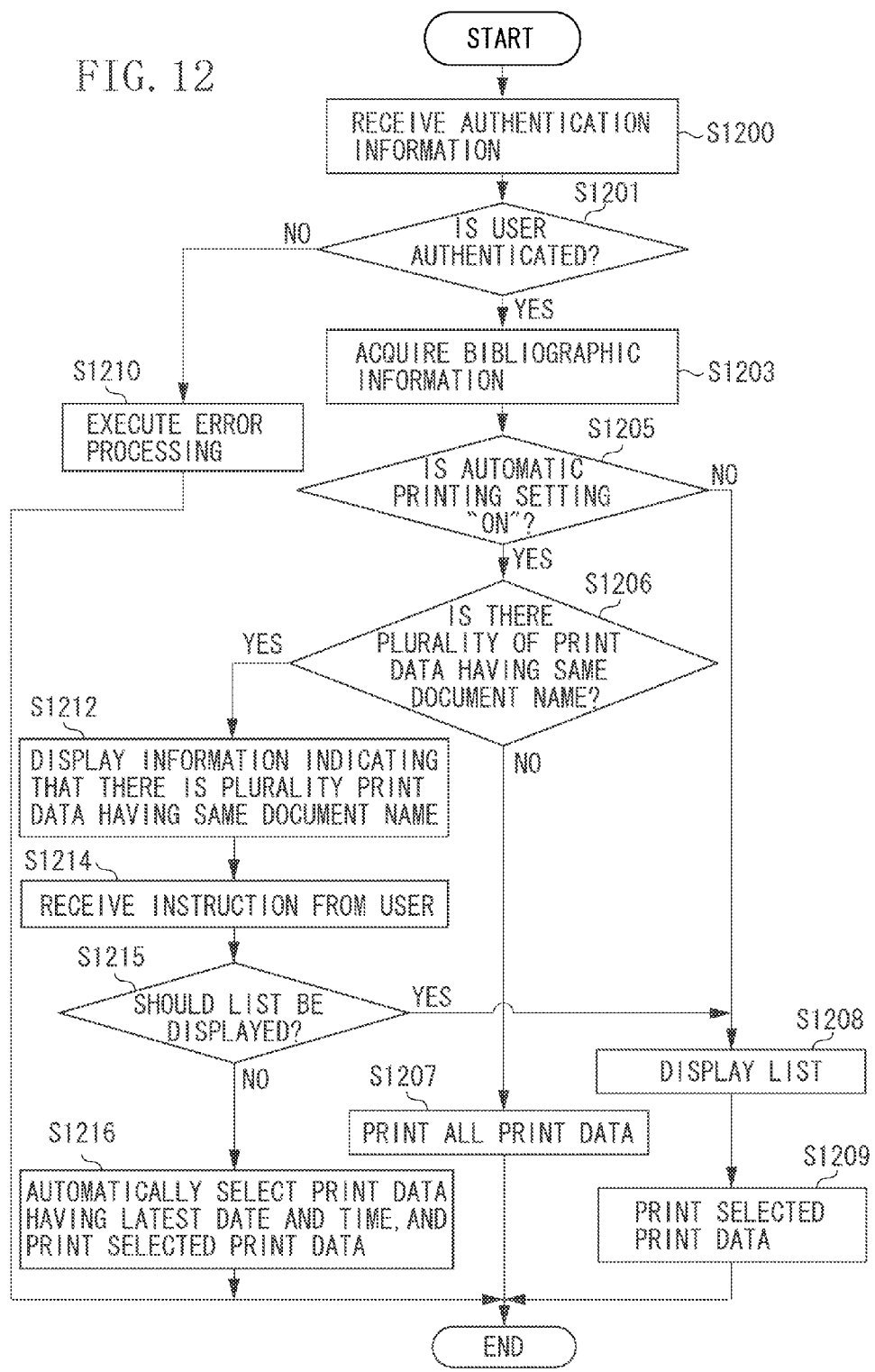
FIG. 12 is a flowchart illustrating print processing according to a third exemplary embodiment.

FIG. 12 is a flowchart illustrating an operation performed by an image forming apparatus 102 when stored print data is printed according to an instruction from a login user according to the third exemplary embodiment. A CPU 202 executes a program loaded from an HDD 205 to a RAM 203 to perform each step of the flowchart illustrated in FIG. 12.

Since processing from step S1200 to step S1210 illustrated in FIG. 12 is substantially the same as that from step S900 to step S910 illustrated in FIG. 9, the description thereof is omitted.

If the CPU 202 determines that a plurality of print data, which is associated with a login user, to which the same document name is added is stored in the HDD 205 (YES in step S1206), the operation proceeds to step S1212. In step S1212, the CPU 202 displays information on an operation unit 207, indicating that the plurality of print data having the same document name is stored in the HDD 205. Herein, information such as a document name, a date and time on which the print data is received, and a print setting is displayed. Then, the CPU 202 allows the user to select a display of a list of bibliographic information of all the print data or execution of print processing on only the latest print data.

In step S1214, the CPU 202 receives an instruction from the user through the operation unit 207. In step S1215, the CPU 202 determines whether a list of the bibliographic information of the print data should be displayed. If the CPU 202 determines that the list should be displayed (YES in step S1215), the operation proceeds to step S1208. On the other hand, if the user instructs the CPU 202 to print only the latest print data (NO in step S1215), the operation proceeds to step S1216. In step S1216, the CPU 202 selects the print data having the latest date and time of reception from the print data having the same document name, and executes print processing on the selected print data.

According to the present exemplary embodiment, therefore, in a case where a plurality of print data having the same document name is stored in the HDD 205, the CPU 202 notifies the user accordingly, so that the user can select whether the list should be displayed or only the latest print data should be printed.

The first, second, and third exemplary embodiments have been described using example cases in which the image forming apparatus 102 executes each processing of the flowcharts illustrated in FIGS. 7, 9, 11, and 12. However, at least part of the processing described referring to these flowcharts may be executed by a server (or a server group) providing cloud services. For example, a system including a server (not illustrated) providing cloud services, a PC 101, and an image forming apparatus 102 may be arranged. In such a system, the server may receive and store print data transmitted from the PC 101. Upon reception of a print instruction from the image forming apparatus 102, the server may determine whether a plurality of print data having the same document name is stored in the server. If a plurality of print data having the same document name is stored in the server, the server may allow a user of the image forming apparatus 102 to select any of the print data to be printed. In such a case, the server may transmit only the selected print data to the image forming apparatus 102, and the image forming apparatus 102 may print the selected print data.

Alternatively, the image forming apparatus 102 may acquire a list of the print data stored in the server. If the acquired list includes one print data or a plurality of print data having the same document name, the image forming apparatus 102 may perform automatic print processing. If the acquired list does not include such print data, the image forming apparatus 102 may not perform automatic print processing (or may print only the latest print data).

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-136173 filed Jun. 28, 2013, which is hereby incorporated by reference herein in its entirety.

What is claimed is:

1. An image forming apparatus that uses a storage capable of storing printing data and an image forming device that forms an image on a sheet based on the printing data, the image forming apparatus comprising:
   a controller, having a processor which executes instructions stored in a memory or having circuitry, being configured to:
   cause the storage to store therein plural printing data, including first printing data and second printing data, associated with a specific user;
   accept a login by the specific user;
   determine that printing data, whose document name is same as a document name of the first printing data, does not exist in the plural printing data, and causing the image forming device to perform image forming based on the first printing data not on a basis of a printing data selection instruction made by the specific user but automatically on a basis of the login by the specific user; and
   determine that printing data, whose document name is same as a document name of the second printing data, exists in the plural printing data, and causing the image forming device to perform the image forming based on the second printing data on a basis of the printing data selection instruction made by the specific user.

2. The image forming apparatus according to claim 1, further comprising a display device that displays information, wherein the controller causes the display device to display a list of the plural printing data that are associated with the logged in specific user and that include the second printing data.

3. The image forming apparatus according to claim 2, wherein the controller causes the image forming device to perform the image forming based on the first printing data without causing the display device to display a screen enabling the specific user to select printing data for which a print instruction is to be issued.

4. A control method for an image forming apparatus that uses a storage capable of storing printing data and an image forming device that forms an image on a sheet based on the printing data, the control method comprising:
   causing the storage to store therein plural printing data, including first printing data and second printing data, associated with a specific user;
   accepting a login by the specific user;
   determining that printing data, whose document name is same as a document name of the first printing data, does not exist in the plural printing data, and causing the image forming device to perform image forming based on the first printing data not on a basis of a printing data selection instruction made by the specific user but automatically on a basis of the login by the specific user; and
   determining that printing data, whose document name is same as a document name of the second printing data, exists in the plural printing data, and causing the image forming device to perform the image forming based on the second printing data on a basis of the printing data selection instruction made by the specific user.

5. A non-transitory storage medium storing a program for causing a computer to perform operations comprising:
   causing a storage to store therein plural printing data, including first printing data and second printing data, associated with a specific user;
   accepting a login by the specific user;
   determining that printing data, whose document name is same as a document name of the first printing data, does not exist in the plural printing data, and causing an image forming device to perform image forming based on the first printing data not on a basis of a printing data selection instruction made by the specific user but automatically on a basis of the login by the specific user; and
   determining that printing data, whose document name is same as a document name of the second printing data, exists in the plural printing data, and causing the image forming device to perform the image forming based on the second printing data on a basis of the printing data selection instruction made by the specific user.

6. An image forming apparatus that uses a storage capable of storing printing data and an image forming device that forms an image on a sheet based on the printing data,
   the image forming apparatus comprising a controller, having a processor which executes instructions stored in a memory or having circuitry, being configured to:
   cause the storage to store therein plural printing data, including first printing data and second printing data, associated with a specific user;
   accept a login by the specific user;
   determine that printing data, whose document name is same as a document name of the first printing data, does not exist in the plural printing data, and cause the image forming device to perform image forming based on the first printing data not on a basis of a printing data selection instruction made by the specific user but automatically on a basis of the login by the specific user; and
   determine that printing data, whose document name is same as a document name of the second printing data, exists in the plural printing data, and not cause the image forming device to perform image forming based on the second printing data but cause the storage to delete the second printing data.

7. The image forming apparatus according to claim 6, further comprising a display device that displays information, wherein the controller causes the display device to display a list of plural printing data associated with a logged in specific user, the list including second printing data.

8. The image forming apparatus according to claim 7, wherein the controller causes the image forming device to perform image forming based on the first printing data without causing the display device to display a screen enabling the specific user to select printing data for which a print instruction is to be issued.

9. The image forming apparatus according to claim 6, wherein a date and time at which the second printing data has been stored in the storage is older than a date and time at which the printing data, whose document name is the same as the document name of the second printing data, has been stored in the storage.

10. A control method for an image forming apparatus that uses a storage capable of storing printing data and an image forming device that forms an image on a sheet based on the printing data, the control method comprising:

causing the storage to store therein plural printing data, including first printing data and second printing data, associated with a specific user;

accepting a login by the specific user;

determining that printing data, whose document name is same as a document name of the first printing data, does not exist in the plural printing data, and causing the image forming device to perform image forming based on the first printing data not on a basis of a printing data selection instruction made by the specific user but automatically on a basis of the login by the specific user; and determining that printing data, whose document name is same as a document name of the second printing data, exists in the plural printing data, and not causing the image forming device to perform image forming based on the second printing data but cause the storage to delete the second printing data.

11. A non-transitory storage medium storing a program for causing a computer to perform operations comprising:

causing a storage to store therein plural printing data, including first printing data and second printing data, associated with a specific user;

accepting a login by the specific user;

determining that printing data, whose document name is same as a document name of the first printing data, does not exist in the plural printing data, and causing an image forming device to perform image forming based on the first printing data not on a basis of a printing data selection instruction made by the specific user but automatically on a basis of the login by the specific user; and determining that printing data, whose document name is same as a document name of the second printing data, exists in the plural printing data, and not causing the image forming device to perform image forming based on the second printing data but causing the storage to delete the second printing data.

\* \* \* \* \*